United States Patent
Bailey

(10) Patent No.: US 12,321,729 B2
(45) Date of Patent: Jun. 3, 2025

(54) IDENTIFYING INVOLVEMENT OF APPLICATION SERVICES IN A DISTRIBUTED APPLICATION

(71) Applicant: INTERNATIONAL BUSINESS MACHINES CORPORATION, Armonk, NY (US)

(72) Inventor: Christopher Neil Bailey, Romsey (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 123 days.

(21) Appl. No.: 17/991,107

(22) Filed: Nov. 21, 2022

(65) Prior Publication Data

US 2024/0168734 A1    May 23, 2024

(51) Int. Cl.
| | | |
|---|---|---|
| G06F 9/44 | (2018.01) | |
| G06F 8/41 | (2018.01) | |
| G06F 9/445 | (2018.01) | |
| G06F 9/455 | (2018.01) | |
| G06F 9/50 | (2006.01) | |
| G06F 11/362 | (2025.01) | |

(52) U.S. Cl.
CPC ............ *G06F 8/433* (2013.01); *G06F 9/5077* (2013.01); *G06F 11/3636* (2013.01)

(58) Field of Classification Search
CPC ..... G06F 8/433; G06F 9/5077; G06F 11/3636
See application file for complete search history.

(56) References Cited

U.S. PATENT DOCUMENTS

| | | | | |
|---|---|---|---|---|
| 8,286,149 B2* | 10/2012 | Dor | ............ | G06F 8/71 |
| | | | | 717/151 |
| 8,745,584 B2* | 6/2014 | Huang | ........ | G06F 8/71 |
| | | | | 717/121 |
| 9,928,517 B1* | 3/2018 | Hitchcock | .......... | G06Q 30/0201 |
| 11,068,328 B1* | 7/2021 | Rafey | ................... | G06F 11/302 |
| 11,704,188 B2* | 7/2023 | Gupta | ..................... | H04L 41/22 |
| | | | | 714/37 |
| 11,789,804 B1* | 10/2023 | Danyi | .................. | G06F 11/323 |
| | | | | 714/38.1 |

(Continued)

FOREIGN PATENT DOCUMENTS

| | | | | | |
|---|---|---|---|---|---|
| CN | 112380130 A | * | 2/2021 | .......... | G06F 11/3624 |
| EP | 3882773 A1 | * | 9/2021 | .......... | G06F 11/0709 |

OTHER PUBLICATIONS

Ambichl Ernst (EP 3882773 A1), 2021, pp. 1-36. (Year: 2021).*

(Continued)

*Primary Examiner* — Mongbao Nguyen
(74) *Attorney, Agent, or Firm* — Rakesh Roy

(57) ABSTRACT

A method, computer program product, and computer system for identifying involvement of application services in a distributed application. The method includes accessing traced request data of application requests for a distributed application and determining dependencies and call frequency between application services from the traced request data of the application requests. The method includes obtaining an involvement factor of an application service as a measure of involvement of the application service in the application requests based on the dependencies and call frequencies. The method applies the involvement factor to availability and functioning management of the distributed application.

20 Claims, 9 Drawing Sheets

(56) References Cited

U.S. PATENT DOCUMENTS

| | | | |
|---|---|---|---|
| 11,947,439 B2* | 4/2024 | Kang | G06F 11/3466 |
| 2018/0213061 A1 | 7/2018 | Kakaraparthi | |
| 2018/0332138 A1 | 11/2018 | Liu | |
| 2020/0257567 A1 | 8/2020 | Fontanari Filho | |
| 2021/0334194 A1* | 10/2021 | Xiao | G06F 11/3466 |
| 2022/0035627 A1 | 2/2022 | Catalano | |
| 2022/0058072 A1* | 2/2022 | Poghosyan | G06F 18/24317 |
| 2022/0058073 A1* | 2/2022 | Poghosyan | G06F 11/3476 |
| 2022/0083454 A1* | 3/2022 | Cirone | G06F 9/542 |
| 2023/0251851 A1* | 8/2023 | Carre | G06F 8/70 |
| | | | 717/120 |
| 2023/0325204 A1* | 10/2023 | Dockter | G06F 9/5005 |
| | | | 707/798 |
| 2024/0086160 A1* | 3/2024 | Kanso | G06F 9/547 |

OTHER PUBLICATIONS

Alexandru-Florian Antonescu, Dynamic Optimization of SLA-Based Services Scaling Rules, 2013, pp. 1-8. https://ieeexplore.ieee.org/stamp/stamp.jsp?tp=&arnumber=6753809 (Year: 2013).*

Chunming Hu, Toposch: Latency-Aware Scheduling Based on Critical Path Analysis on Shared Yarn Clusters, 2020, pp. 1-9. https://ieeexplore.ieee.org/stamp/stamp.jsp?tp=&arnumber=9284241 (Year: 2020).*

English translation, Xu (CN 112380130 A), 2021, pp. 1-14. (Year: 2021).*

* cited by examiner

IDENTIFYING INVOLVEMENT OF APPLICATION SERVICES IN A DISTRIBUTED APPLICATION

BACKGROUND

The present invention relates to distributed application availability and functioning, and more specifically, to identifying involvement of application services in a distributed application.

Software solutions and business applications are increasingly becoming complex distributed applications, particularly with the adoption of microservices and cloud-native architectures. This move from traditional deployments such as "three tier" architectures, which have a small number of "monolith" services that are involved in every request, to highly distributed architectures with large number of services many of which are only involved in a subset of requests, makes it harder to identify the services that are critical to the availability of the overall solution.

Making it possible to understand the services and infrastructure that are highly involved in, and therefore critical to, an application makes it possible to focus and target engineering resources to prioritize the availability of more critical services and infrastructure over less critical ones.

SUMMARY

According to an aspect of the present invention there is provided a computer-implemented method for identifying involvement of application services in a distributed application in which one or more processors perform the method by accessing traced request data of application requests for a distributed application; determining dependencies and call frequency between application services from the traced request data of the application requests; and obtaining an involvement factor of an application service as a measure of involvement of the application service in the application requests based on the dependencies and call frequency.

The method may include determining a fault tolerance measure of application services to faults from callee application services; and obtaining a critical factor of a callee application service based on the involvement factor of caller application services on which callee application service depends, combined with a fault tolerance of the caller application services to the callee application service.

The method may include applying a topology of infrastructure resources used by the application services in the distributed application including dependencies of application services and other resources on the infrastructure resources. The method may include obtaining an involvement factor of a resource used in the distributed application as a measure of involvement of a resource in the application requests based on the dependency of application services and other resources on the resource. The method may include obtaining a critical factor of a resource based on the involvement factor of application services or other resources, which the resource supports, combined with a fault tolerance of the application services or other resources to the resource.

According to another aspect of the present invention there is provided a system for identifying involvement of application services in a distributed application, the system includes a processor and a memory configured to provide computer program instructions to the processor to execute the function of the components including a traced data component for accessing traced request data of application requests for a distributed application; a traced data analysis component for determining dependencies and call frequency between application services from the traced request data of the application requests; and an involvement component for obtaining an involvement factor of an application service as a measure of involvement of the application service in the application requests based on the dependencies and call frequencies.

According to a further aspect of the present invention there is provided a computer program product for identifying involvement of application services in a distributed application, the computer program product comprising a computer readable storage medium having program instructions embodied therewith, the program instructions executable by a processor to cause the processor to perform the program instructions to access traced request data of application requests for a distributed application; determine dependencies and call frequency between application services from the traced request data of the application requests; and obtain an involvement factor of an application service as a measure of involvement of the application service in the application requests based on the dependencies and call frequencies.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will be described, by way of example, with reference to the accompanying drawings.

Figure 1:
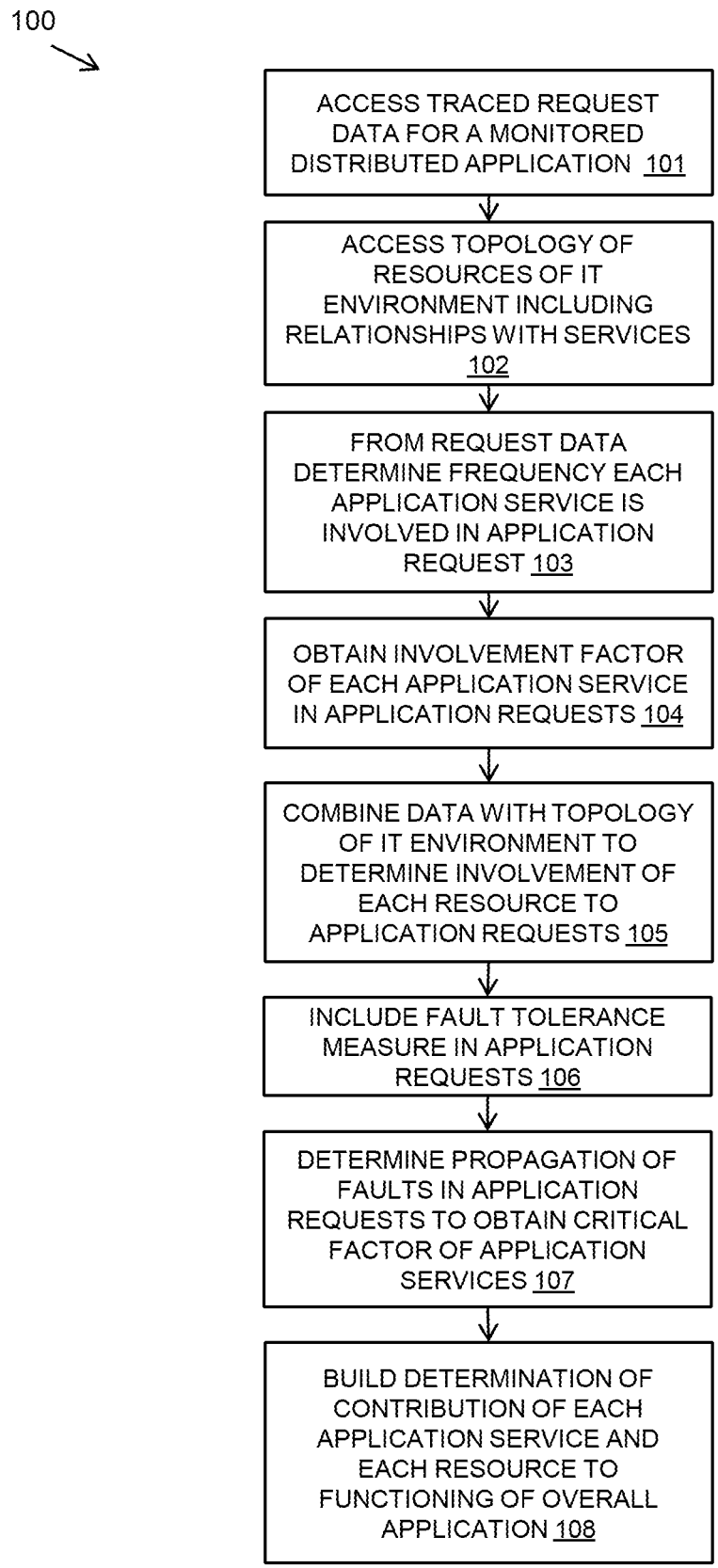
FIG. 1 is a flow diagram of an example embodiment of a method in accordance with embodiments of the present invention.

It will be appreciated that for simplicity and clarity of illustration, elements shown in the figures have not necessarily been drawn to scale. For example, the dimensions of

DETAILED DESCRIPTION

Embodiments of a method, system, and computer program product are provided for determining the involvement of application services in a distributed application. This may be applied to ensure the availability and correct functioning of the distributed application.

Dependencies of application services and their calling frequency in application requests provide a basis for determining an involvement factor of application services. The involvement factor of the application services may contribute to prioritization of the availability of more involved services over less involved ones. The approach may extend to determining the involvement factor of the services in combination with an involvement factor of the information technology (IT) infrastructure resources that support or are responsible for the services.

The approach may also extend to determining a fault tolerance between application services used to determine a critical factor of the application services that takes into account the involvement factor and fault tolerance of dependent services. The critical factor may provide an indication of the ability of services to tolerate faults occurring in their dependencies using application request data to locate application requests that contain one or more faults originating from one or more services that comprise the distributed application.

A service analysis system is used to analyze a distributed application and may utilize data collected by a distributed tracing component in the form of traced end-to-end application request data. The distributed tracing component may be used to identify a frequency of involvement for each application service that contributes to an application request. As referred to herein, the frequency of involvement of an application service refers to the portion of instances in which the application service receives a request relative to the total instances of application requests, within some designated time boundary of application operation. The distributed tracing component may also be used to determine fault tolerance in the application services.

The service analysis system may also use IT infrastructure information from a topology component. The topology component may be used to determine a contribution of each resource of the IT infrastructure to the availability and correct functioning of the application requests of the distributed application.

The described method and system make it possible to build an enhanced determination of the contribution of each service and, optionally, resources of the IT infrastructure to the availability and correct functioning of the overall applications. This may be used to build a model of a deployment and its utilization to dynamically understand the criticality of each element. A view of how an application is actually deployed may be obtained including how the services are actually being exercised during application requests.

The identification of the involvement of services and the critical services of a distributed application is an improvement in the technical field of computer application performance generally, and more particularly in the technical field of computer application availability, functioning, and fault tolerance.

Referring to FIG. 1, a flow diagram 100 shows an example embodiment of the described method carried out by an application service analysis system.

A distributed tracing component may be used for monitoring distributed applications and collecting end-to-end application request data. For example, this may be achieved using OpenTracing, which is a vendor-agnostic API for including instrument tracing in code, with implementations that apply to physical, virtual, and containerized environments.

A topology component may be used that provides a representation of the IT environment used by the distributed applications and the relationships between infrastructure resources and the application services of the distributed applications. For application services, the resources may include: the containers that the services run in, the clusters the containers are part of, the machines that clusters run on, and the additional resources that are used, such as networking resources or storage resources. The topology component may dynamically discover the topology using application performance monitoring tools, some of which require declared or imported topology definitions.

The method of application service analysis may access 101 traced application request data collected by the distributed tracing component for a monitored distributed application. The method may also access 102 data collected by the topology component to provide data relating to the IT environment infrastructure of the monitored distributed application including relationships between infrastructure resources and the application services.

From the traced request data, the method may determine 103 dependencies between application services and the frequency of involvement of each application service that contributes to application requests. The frequency at which an application service is involved in application requests may be based on a call rate between application services in application requests. The method may obtain 104 an involvement factor of each application service in application requests with the involvement factor as a measure of involvement of each application service. The involvement factor may be a score, such as a percentage, that represents the involvement or contribution of each application service in the application requests. The involvement factor score may be extended to the availability and correct functioning of the distributed application.

The method may combine 105 the application services involvement with topology of the infrastructure from the topology component in order to additionally determine the involvement of each resource of the IT infrastructure to the availability and correct functioning of the application requests and the distributed application. This may apply the topology of infrastructure resources used by the application services in the distributed application including dependencies of application services on the infrastructure resources and dependencies of the infrastructure resources on other resources. An involvement factor may be obtained for a certain resource used in the distributed application as a measure of involvement of the certain resource in the application requests based on the dependency of application services and the dependency of other resources on the certain resource.

The involvement factors may be obtained by building a directed graph of each of the application services providing relationships between the application services and their dependencies and with weightings applied to each edge in the graph. Edges may be weighted according to the percentage of requests from the parent service node to its dependencies, enabling a calculated value to be applied to each node to represent the percentage frequency that it is involved in application requests. The percentage frequency may be for application requests of a defined type or may be for requests of the overall application. The directed graph may be extended with the application service and IT infrastructure relationships from the topology component. Further details of this embodiment are described in FIG. 2A.

The method may extend 106 the analysis to understand the ability of application services to tolerate faults occurring in their called application services using data from the distributed tracing component to locate application requests that contain one or more faults originating from one or more application services that comprise the distributed application.

The method may determine 107 the propagation of fault tolerance in the application requests of the distributed application by obtaining a critical factor of a dependent application service based on the weighted directed graph with involvement factors, with additional weightings of fault tolerance of the caller application service to the callee application services. The critical factor of a callee application service may be obtained based on the weighted involvement factor of the caller application services on which the callee application service depends combined with a fault tolerance of the caller application service to the callee application service. An example embodiment of this aspect is described further with reference to FIG. 2B.

The method may build 108 a determination of the contribution of each application service and, optionally, each resource of the IT infrastructure to the availability and correct functioning of an overall distributed application. This may further include the fault tolerance propagation resulting in a determination of the resilience of the application services in a distributed application.

The method may be carried out based on all application requests in a distributed application or it may be carried out at a more granular level for types of application requests in a distributed application.

Figure 2A:
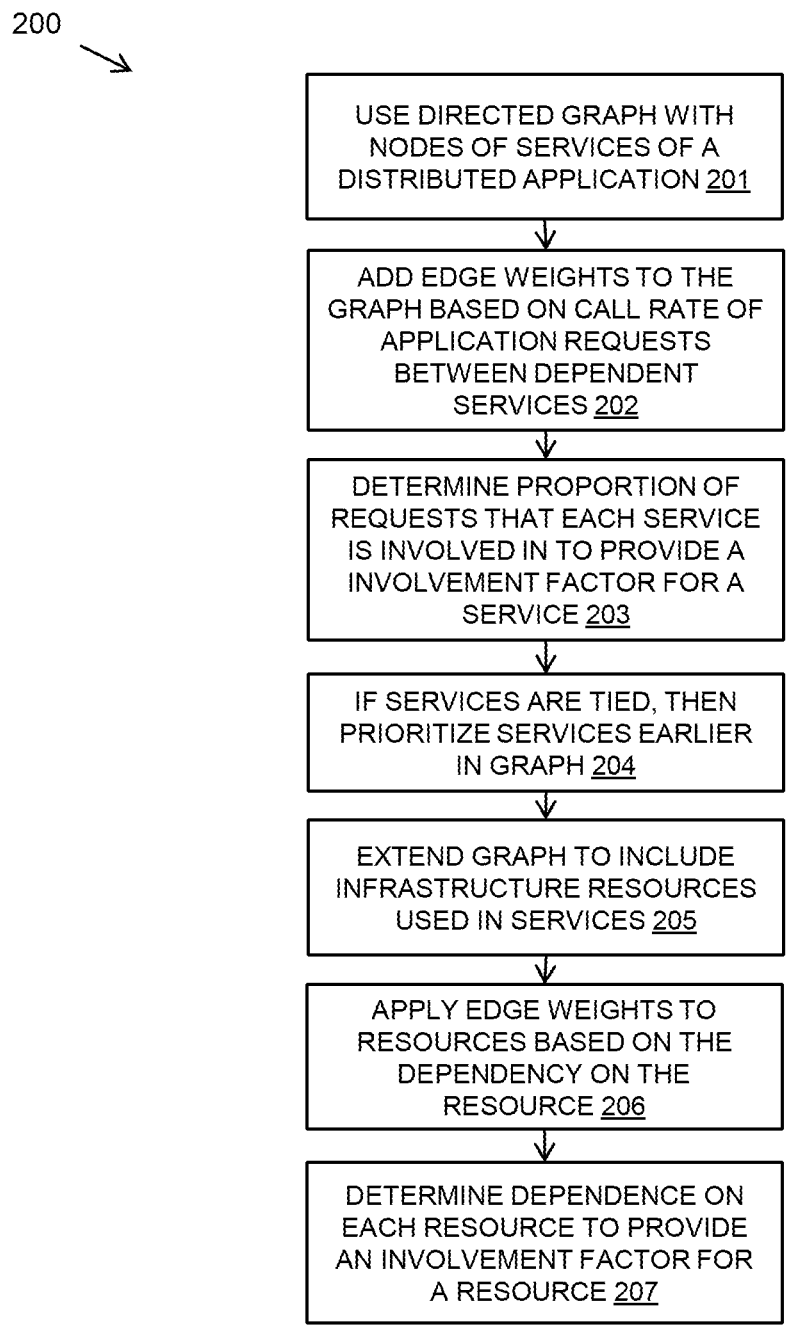
FIGS. 2A and 2B are flow diagrams of example embodiments of aspects of methods in accordance with embodiments of the present invention.

Referring to FIG. 2A, a flow diagram 200 shows an example embodiment of a method of identifying involvement of application services in application requests of a distributed application to obtain an involvement factor of application services and, optionally, an involvement factor of the resources supporting the application services.

The method may use 201 a directed graph with nodes of application services of a distributed application with the nodes having dependencies based on the calling of the application services to and from other application services. The directed graph may be built from data collected of traced application requests. A graph may be built for all the application requests in a distributed application. Alternatively, the graph may be built for application requests of a defined type to provide analysis of application service involvement at a more granular level.

The method may add 202 edge weights to the directed graph based on call rates (i.e., frequencies) of application requests between dependent application services.

The method may determine 203 a proportion of application requests in which an application service is involved to obtain an involvement factor for the application service. The determination of the proportion in which an application service is involved may include tracing branches of the directed graph to determine the involvement factor of an application service based on its caller application services.

In the event that application services have a same involvement factor, an application service earlier in the directed graph may be prioritized 204 and may be determined to have a higher involvement factor.

The method may extend 205 the directed graph to include infrastructure resources used by the application services. The method may apply 206 edge weights to the extended graph for the infrastructure resources based on the dependency of application services on the infrastructure resources or the dependency of infrastructure resources on other resources.

The method may determine 207 dependency of application services and infrastructure resources on a certain resource to obtain an involvement factor for the certain resource. This may involve tracing branches of the directed graph to determine the involvement factor of the certain resource.

Figure 2B:
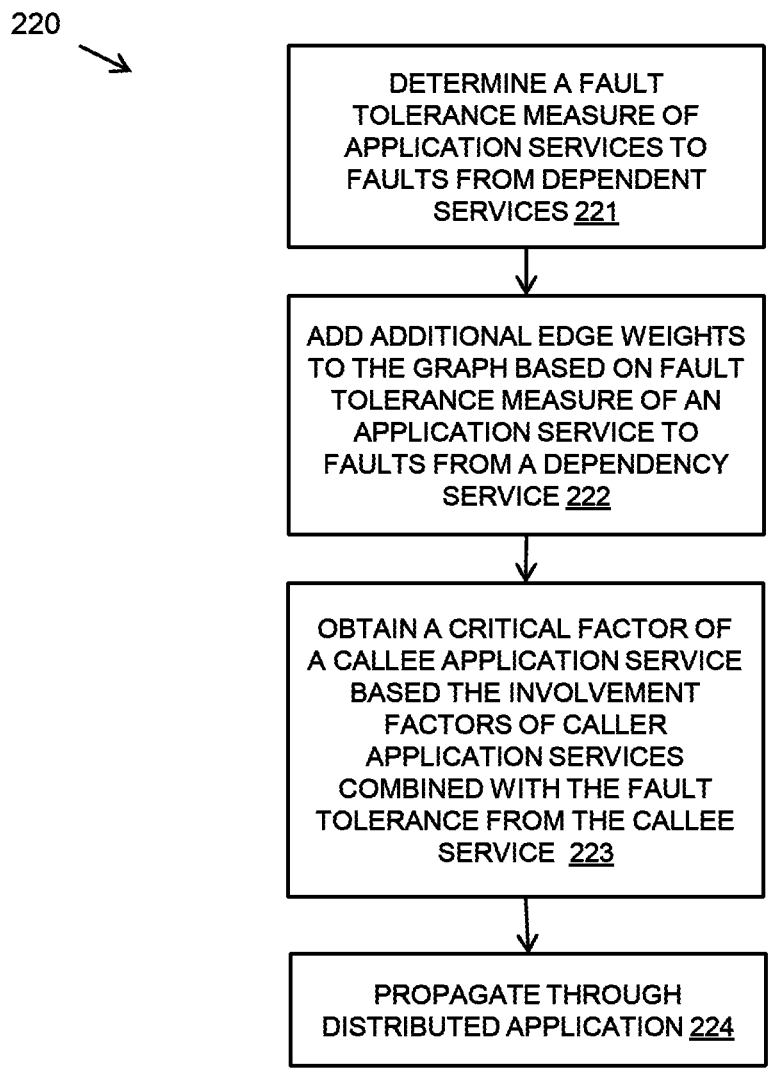

Referring to FIG. 2B, a flow diagram 220 shows an example embodiment of a method of identifying involvement of application services in a distributed application extended to include fault tolerance of application services.

The method may determine 221 a fault tolerance measure of application services to faults from callee application services. The method may add 222 additional edge weightings to a directed graph of application services as used 201 in the method of FIG. 2A with the additional edge weightings representing fault tolerance of a caller application service to a callee application service.

The method may obtain 223 a critical factor of a callee application service based on the weighted involvement factor of caller application services on which callee application service depends combined with a fault tolerance of the caller application service to the callee application service.

The method of obtaining the critical factors of the callee application services may be propagated 224 through the distributed application.

The method determines whether a caller application service that calls a callee application service is tolerant to faults from the callee application service by analyzing whether the caller propagates faults to its own callers (i.e., moving back up the directed graph of application services).

Figure 3A:
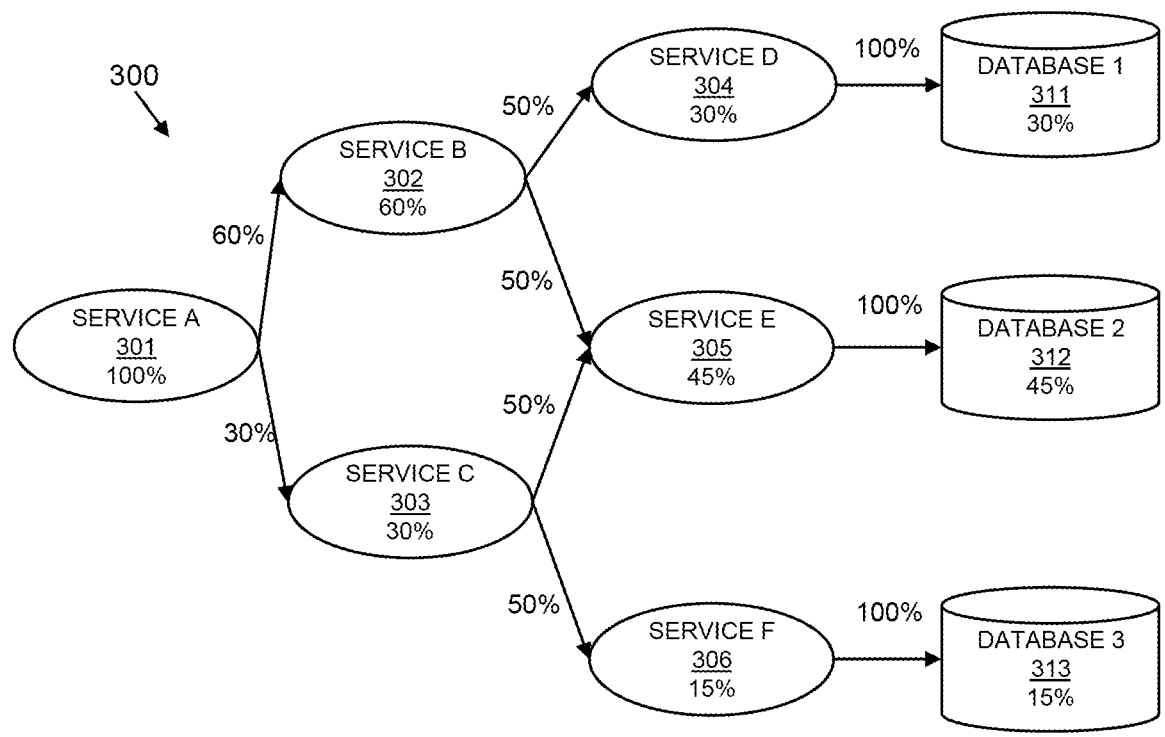
FIG. 3A and FIG. 3B are schematic diagrams of example directed graphs illustrating an embodiment of the present invention.

An example scenario is described in FIG. 3A, illustrating directed graphs used to determine the involvement factor and critical factor of application services and as extended to resources supporting the application services.

FIG. 3A shows an example representation of a directed and weighted graph 300 for application service analysis of application requests in an application. The graph 300 shows six services 301-306 corresponding respectively to services A, B, C, D, E and F, and three databases 311-313, corresponding respectively to databases 1, 2 and 3. Service A 301 provides the only entry point to the application and the databases 311-313 are end points of the requests.

Application requests that start at Service A 301 involve calls to Service B 302 60% of the time, calls to Service C 303 30% of the time, and involve no onward calls 10% of the time, which means that Service A 301 is involved in 100% of requests, Service B 302 for 60% of requests and Service C 303 for 30% of requests. Additionally, it can be seen that Service E 305 is called from Service B 302 for 50% of the requests it receives, and from Service C 303 for 50% of its requests. The percentage calls from services B and C combine to involve Service E 305 in 45% of application requests (i.e., 50% of 60% from Service B 302 plus 50% of 30% from Service C 303).

For the example scenario of FIG. 3A, table 1 featured below, provides a representation of the involvement of each application service to the availability and correct functioning of the application requests. One view of that data is shown in the table below with an involvement factor shown as a percentage for each application service and database.

TABLE 1

Services Table - Involvement Factor

| Application Service | Involvement Factor |
|---|---|
| Service A | 100% |
| Service B | 60% |
| Service E | 45% |
| Database 2 | 45% |
| Service C | 30% |
| Service D | 30% |
| Database 1 | 30% |
| Service F | 15% |
| Database 3 | 15% |

It may be noted that where application services have the same involvement factor, for example, Service F 306 and Database 3 313 that both have a 15% criticality factor, it is possible to prioritize Service F 306 above Database 3 313 using the directed graph relationships, because Service F 306 dominates (i.e., exclusive entry to Database 3 313) and, therefore, application requests reach Service F 306 ahead of reaching Database 3 313.

The example scenario may be extended to provide IT infrastructure resource involvement analysis.

The directed and weighted graph of FIG. 3A from the application service analysis may be combined with the IT infrastructure supply chain relationships from a topology component in order to extend the calculated value for application service involvement to IT infrastructure. This may be provided by representing a percentage frequency that each resource of IT infrastructure is involved in requests to the overall application. When extending the directed graph to IT infrastructure resources, edges may be weighted according to the percentage dependency between the application service and the infrastructure resource it depends on, or between other resources of the IT infrastructure in order to support virtualization and clustering.

Figure 3B:
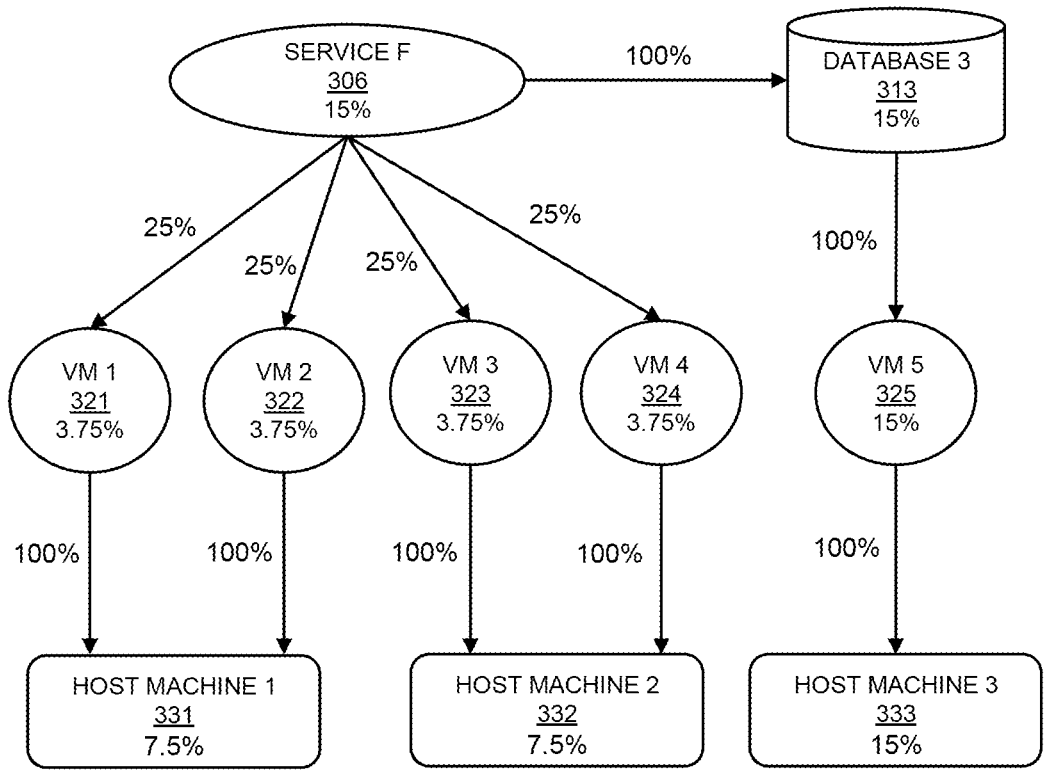

FIG. 3B shows a graph that looks specifically at Service F 306 and Database 3 313 from the application service analysis example of FIG. 3A, where Service F 306 and Database 3 313 are both involved in 15% of application requests.

Service F 306 is deployed using four equally load balanced replicas of the service in a cluster, with each replica running inside a separate virtual machine 321-324. This is represented as 25% weighting for the edge relationships between Service F 306 and each virtual machine 321-324, resulting in each of the virtual machines 321-324 (i.e., corresponding respectively to VM 1, VM 2, VM 3, and VM 4), being involved in 3.75% of the application requests. Additionally, it can be seen that the four virtual machines 321-324 run on two host machines 331, 332, corresponding respectively to Host Machine 1 and Host Machine 2, each supporting two of the virtual machines 321-324. Each of 331 host machine 1 and 332 host machine 2 are included in 7.5% of overall application requests.

Table 2 provides a representation of the involvement of each IT infrastructure resource to the availability and correct functioning of the application, and allows views of the application and service involvement to be extended to include infrastructure resources.

TABLE 2

Services and Resources Table - Involvement Factor

| Application Service & Infrastructure Resource | Involvement Factor |
|---|---|
| Service A | 100% |
| Service B | 60% |
| Service E | 45% |
| Database 2 | 45% |
| Service C | 30% |
| Service D | 30% |
| Database 1 | 30% |
| Service F | 15% |
| Database 3 | 15% |
| Virtual Machine 5 | 15% |
| Host Machine 3 | 15% |
| Host Machine 1 | 7.5% |
| Host Machine 2 | 7.5% |
| Virtual Machine 1 | 3.75% |
| Virtual Machine 2 | 3.75% |
| Virtual Machine 3 | 3.75% |
| Virtual Machine 4 | 3.75% |

The above representation of involvement may apply to all requests made of a given application. This may also be applied at a more granular level where additional request type data is available, and it is desirable to understand the involvement of services or IT resources to specific types of requests. This is particularly important where different services may be used at different rates for different types of requests.

An example may be where an application has service requests from mobile devices and service requests from web browsers. The above calculations may be applied with an inclusion of the analysis of the "User-Agent" HTTP (hypertext transfer protocol) header of the application request as an indication of the source of the request (i.e., web browser application).

A second example may be for multi-tenant applications where different tenants may have some of their own tenant-specific components or different models. The above calculations may be applied with the inclusion of the analysis of a tenant ID field that may be part of a HTTP header or a URL (uniform resource locator) encoded parameter in the application request.

This ability to determine the involvement of application services and IT infrastructure resources makes it possible to understand the services and infrastructure that are critical to an application and makes it possible to focus and target engineering resources to prioritizing the availability of more critical services and infrastructure over less critical ones.

With the growing and widespread adoption of fault tolerance design patterns and libraries, the described involvement factor analysis may be extended to identify and account for fault tolerance of the application services of distributed applications. Accounting for fault tolerance of application services of distributed applications may result in obtaining a resilience factor for application services with resilience to fault tolerance.

Referring to FIGS. 4A to 4D, the directed graph model of FIGS. 3A and 3B is extended to add a second weighting to each edge for a fault tolerance measure. The two weightings in the graph are stored values for:

A call rate weighting, which may be the percentage of requests received by a parent service node that result in calls to its dependency; and A fault tolerance weighting, which may be the percentage of faulty responses from a dependency that its parent service can tolerate and therefore not propagate.

Additionally it extends the directed graph model to add a second value stored on each node for a critical factor. Each node therefore has stored values for:

An involvement factor, which may be the percentage in which a service is involved in calls as a result of application requests; and A critical factor, which may be the percentage in which a service is critical to the availability and correct functioning of the overall application.

Figure 4A:
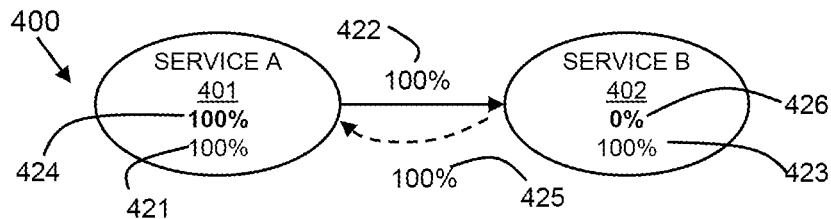
FIG. 4A to FIG. 4D are schematic diagrams of example directed graphs illustrating an embodiment of the present invention.

FIG. 4A shows a simple directed graph model 400 for an application comprising two services: Service A 401 and Service B 402 where Service A 401 provides the only entry point to the application.

Here 100% of application requests arrive at Service A 401, giving it a 100% involvement factor 421 as it is involved in all requests. For 100% of those requests, calls (shown with the full arrow) are made from Service A 401 to Service B 402 providing a 100% call rate 422 between Service A 401 and Service B 402, and giving Service B 402 a 100% involvement factor 423. Service A 401 is however also 100% fault tolerant 425 of any faults in responses (shown with the hashed arrow) from Service B 402, which sets the criticality factor 426 of Service B 402 as 0% as no faults from Service B 402 will affect the overall availability and correct functioning of the application. Service A 401 has a criticality factor 424 of 100% as any faults in Service A 401 will affect the application.

This extends the approach to use the data from the distributed tracing component to locate application requests that contain one or more faults originating from one or more services that comprise the application. The mechanism determines whether a caller service (e.g., Service A 401) that calls a callee service (e.g., Service B 402) is tolerant to faults from the callee service by analyzing whether the caller propagates faults to its own callers, for example whether faults from Service B 402 in responses to Service A 401 are propagated to application users making calls of Service A 401.

Figure 4B:
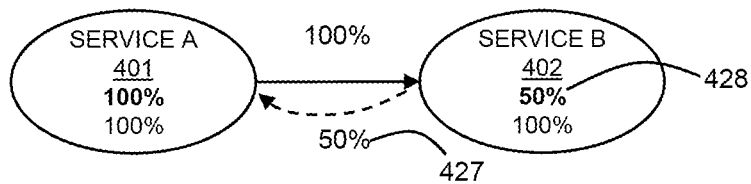

FIG. 4B shows the same two application services, Service A 401 and Service B 402, but with a 50% fault tolerance by Service A 401 to faults from Service B 402.

Here the criticality factor 428 of Service B 402 becomes 50% as half 427 of the faults from Service B 402 will affect the overall availability and correct functioning of the application.

The fault toleration weighting may be calculated by looking at the response received by the caller service (Service A 401) from its callee service (Service B 402) in the trace application request data.

Where Service A 401 receives a fault from Service B 402, Service A 401 can be seen to tolerate the fault if the response from Service A 401 to its own caller does not represent a fault. The response from a callee service is considered to contain a fault when it contains an error that is not a logical error response from the application. For example, if Service B 402 provides the capability to validate email addresses, a response denoting an invalid email is not a fault as it is part of the correct functioning of the application.

The method for differentiating between a logical application error response and a fault is request protocol specific. For example, when looking at requests using the HTTP protocol this may be determined by inspecting the HTTP response code which provides classes of response codes according to the type of error:

1xx informational response—the request was received, continuing process;

2xx successful—the request was successfully received, understood, and accepted;

3xx redirection—further action needs to be taken in order to complete the request;

4xx client error—the request contains bad syntax or cannot be fulfilled;

5xx server error—the server failed to fulfil an apparently valid request.

This shows that codes that start with 5xx are caused by the callee service and are therefore faults.

If an application request that makes a call from Service A 401 to Service B 402 receives a 5xx response from Service B 402, but the response from Service A 401 to its own caller is a non-fault response (e.g., a 2xx code) then Service A 401 is seen to be fault tolerant to that fault response from Service B 402.

Figure 4C:
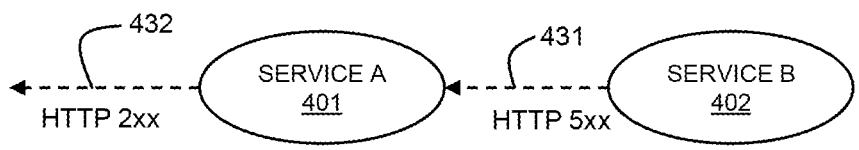

FIG. 4C, Service A 401 is fault tolerant of the HTTP 5xx response 431 from Service B 402 as its own response is HTTP 2xx 432.

The fault tolerance factor for the edge between Service A 401 and Service B 402 becomes the ratio of all fault responses from Service B 402 that Service A 401 can tolerate and not propagate to its own callers.

Figure 4D:
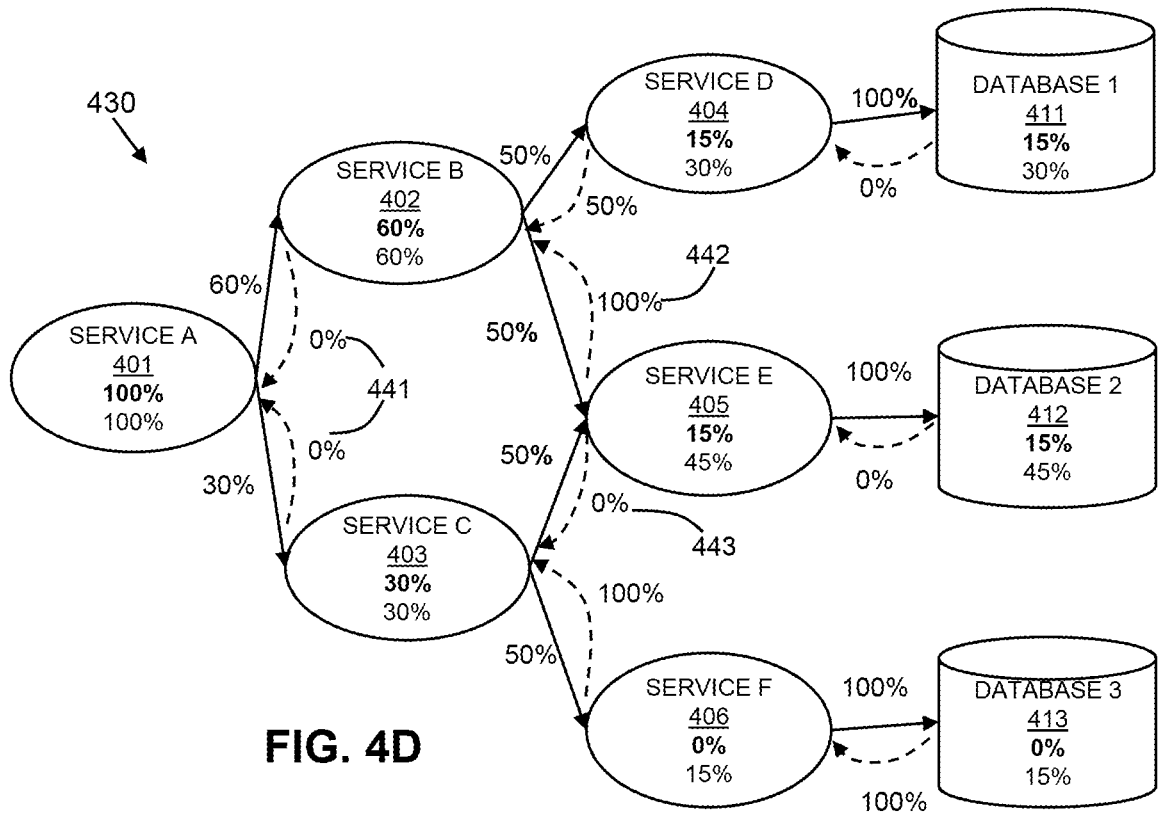

Referring to FIG. 4D, a directed and weighted graph 430 is shown based on the graph 300 of FIG. 3A and including the involvement factors of FIG. 3A shown in the nodes (in regular font). The directed and weighted graph 430 of FIG. 4D includes hashed arrows showing the fault tolerance weightings and criticality factors shown in the nodes in bold.

The graph 430 shows six services 401-406, corresponding respectfully to services A, B, C, D, E and F, and three databases 411-413, corresponding to databases 1, 2 and 3. Service A 401 provides the only entry point to the application and the databases 411-413 are end points of the requests.

Application requests that start at Service A 401 involve calls to Service B 402 60% of the time, calls to Service C 403 30% of the time, and involve no onwards calls 10% of the time. Additionally, there is no fault tolerance 441 in Service A 401 for fault responses from Service B 402 or Service C 403. This means that Service A 401 has an involvement factor and criticality factor of 100% as it is involved in 100% of requests and the faults from Service B 402 and Service C 403 will affect the overall availability and correct functioning of the application. Service B 402 has an involvement factor and a criticality factor of 60% as it is involved in 60% of requests and Service C 403 has an involvement factor and a criticality factors of 30% as it is involved in 30% of requests.

It can be seen that Service E 405 is called from both Service B 402 for 50% of the requests it receives, and from Service C 403 for 50% of its requests. This combines to give Service E 405 an involvement factor of 45% of application requests as shown in FIG. 3A (50% of 60%=30% from Service B 402, plus 50% of 30%=15% from Service C 403, in total equals 45%).

It can also be seen that Service B 402 has a 100% fault tolerance 442 for fault responses from Service E 405 and that Service C 403 has a 0% fault tolerance 443 for fault responses from Service E 405. This results in Service E 405 having a criticality factor of 15% as faults in the 30% (i.e., 50% of 60% of requests) from Service B 402 are 100% tolerated, which gives 0%, plus the 15% (i.e., 50% of 30% of requests) of critical requests from Service C 403.

The criticality factor for a callee node may be summarized as the sum for all caller nodes to the callee node of (the caller node involvement factor)*(the call rate to the callee node) *(100−the fault tolerance of the caller node to the callee node).

When all application requests are analyzed, this provides a representation of the application involvement and application criticality of each component to the availability and correct functioning of the application. One view of that data is shown in Table 2 illustrated below.

TABLE 3

Services and Resources Table - Involvement Factor and Criticality Factor based on Fault Tolerance, expressed as a percentage of application requests.

| Application Service | Involvement Factor | Criticality Factor |
| --- | --- | --- |
| Service A | 100% | 100% |
| Service B | 60% | 60% |
| Service C | 30% | 30% |
| Service E | 45% | 15% |
| Database 2 | 45% | 15% |
| Service D | 30% | 15% |
| Database 1 | 30% | 15% |
| Service F | 15% | 0% |
| Database 3 | 15% | 0% |

Table 3 indicates that although Service F 406 and Database 3 413 are involved in 15% of application requests, the application is fully tolerant to faults seen at Service F 406 and Database 3 313 and, therefore, those components are not critical to the availability and correct functioning of the overall application.

As changes occur to the application, for example changes in application architecture to add, remove, or modify services, or as the application changes in call rates and fault tolerance levels, the graph may be dynamically updated to reflect the changes. Application owners, developers, and operations teams may be notified of change updates so that the appropriate and correct level of engineering efforts can be directed to the critical components of the application.

The extended directed graph of call rates, fault tolerance, involvement factor, and criticality factor can also be extended to the IT infrastructure resources on which the services run in which there is access to topology information or the "supply chain" of IT resources on which the services run.

The extended graph may be built at a more granular level where additional request type data is available and it is desirable to understand the criticality of services or IT components to specific types of requests as discussed above.

Figure 5:
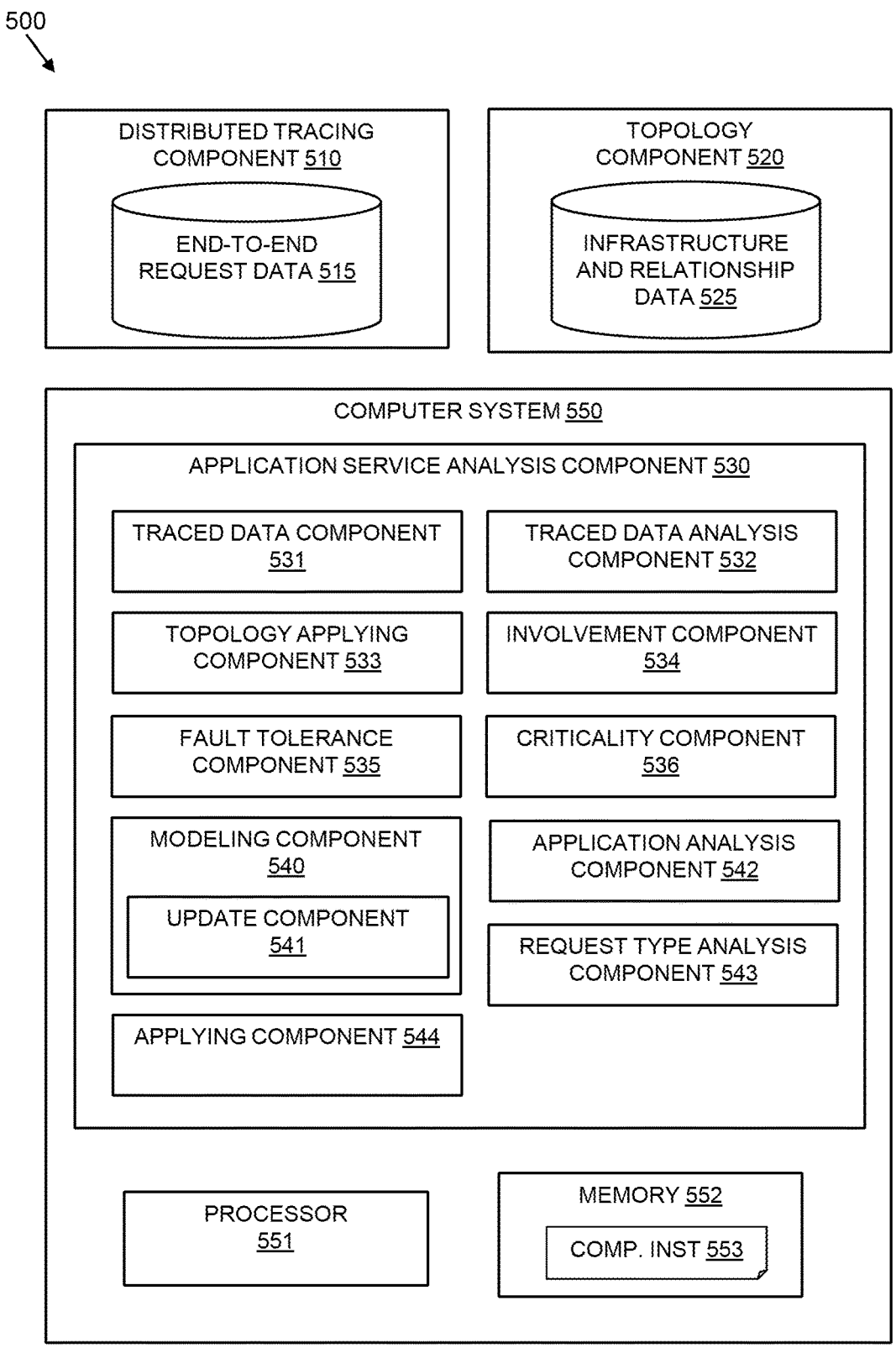
FIG. 5 is block diagram of an example embodiment of a system in accordance with embodiments of the present invention.

Referring to FIG. 5 a block diagram shows an example embodiment of a system 500 including an application service analysis system 530 executing on a computer system 550.

The system 500 may include a distributed tracing component 510 that is accessed by the application service analysis system 530. The distributed tracing component 510 may use known approaches for monitoring distributed applications and collecting end-to-end request data 515. This may be achieved using OpenTracing, with implementations applied to physical, virtual, and containerized environments.

The system 500 may include a topology component 520 to provides a representation of the IT environment and the relationships between infrastructure resources. There are known implementations of topology component 520 for application services and IT infrastructure topology, some of which dynamically discover the topology including application performance monitoring tools, and some of which require declared or imported topology definitions. The topology component 520 may store infrastructure and relationship data 525 and can be accessed by the application service analysis component 530.

The application service analysis component 530 may execute on a computer system 550, which includes at least one processor 551, a hardware module or a circuit for executing the functions of the described components (not shown), which may be software units executing on the at least one processor. In some embodiments, multiple processors running parallel processing threads may be provided enabling parallel processing of some or all of the functions of the components. Memory 552 may be configured to provide computer instructions 553 to the at least one processor 551 to carry out the functionality of the components.

The application service analysis component 530 utilizes data collected by the distributed tracing component 510 in order to identify the frequency at which each application service is involved in and, therefore, contributes to an application request. The frequency of involvement of the application services provides an involvement factor in the form of a score that represents the contribution of each service to the availability and correct functioning of the applications. The involvement factor may be optionally combined with the application service and IT infrastructure relationships 525 from the topology component 520 in order to additionally determine the contribution of each resource of the IT infrastructure to the availability and correct functioning of the applications.

The application service analysis component 530 utilizes end-to-end request data 515 from the distributed tracing component 510 in order to build a directed graph of each of the application services providing relationships between services and their dependencies and with weightings applied to each edge in the graph. Edges are weighted according to the percentage of requests from the parent service node to each dependency service node, enabling a calculated value to be applied to each node to represent the percentage of requests to the overall application in which the respective node is involved. The directed graph can be extended with the application service and IT infrastructure relationships from the topology component.

The application service analysis component 530 extends to also using the data from the distributed tracing component 510 to locate application requests that contain one or more faults originating from one or more services that comprise the application. The mechanism determines whether a caller service that calls a callee service is tolerant to faults from the callee service by analyzing whether the caller propagates faults to its own callers. This makes it possible to build an enhanced determination of the contribution of each service and each resource of the IT infrastructure to the availability and correct functioning of the overall applications.

The application service analysis component 530 may include the following components in the form of software modules providing the described functionality.

A traced data component 531 may be provided for accessing traced end-to-end request data 515 of application requests for a distributed application from the distributed tracing component 510. A traced data analysis component 532 may be provided for determining dependencies and call frequency between application services from the traced end-to-end request data 515 of the application requests.

A topology applying component 533 may be provided for applying a topology of infrastructure resources used by the application services in the distributed application including dependencies of application services and other resources on the resources.

An involvement component 534 may be provided for obtaining an involvement factor of an application service as a measure of involvement of the application service in the application requests based on the dependencies and call frequencies. The involvement component 534 may also obtain an involvement factor of a resource used in the distributed application as a measure of involvement of a certain resource in the application requests based on the dependency of application services and other resources on the certain resource.

A fault tolerance component 535 may be provided for determining a fault tolerance measure of application services to faults from callee application services and a criticality component 536 may be for obtaining a critical factor of a callee application service based on the involvement factor of caller application services on which callee application service depends combined with a fault tolerance of the caller application services to the callee application service. The criticality component 536 may also be for obtaining a critical factor of a certain resource based on the involvement factor of application services or other resources that the certain resource supports, combined with a fault tolerance of the application services or other resources to faults received from the certain resource.

A modeling component 540 may be provided for using a directed graph of the application services in application requests and applying edge weights to the graph based on call rates between application services in the application requests to obtain the involvement factor of an application service in the application requests. The modeling component 540 may include applying fault tolerance weightings to the directed graph based on a fault tolerance measure of application services to faults from callee application services to obtain a critical factor for a callee application service based on the involvement factor of caller application services on which callee application service depends combined with a fault tolerance of the caller application services to the callee application service. The modeling component 540 may include extending the directed graph to include infrastructure resources used by the application services and applying edge weights to the graph for the resources based on the dependency of application services on the resources or the dependency of resources on other resources to obtain an involvement factor of a resource in the application requests. The modeling component 540 includes an update component 541 for dynamically updating the directed graph to reflect changes in the distributed application.

An application analysis component 542 may be provided wherein the modelling and analysis is carried out for all application requests in the distributed application.

A request type analysis component 543 may be provided for accessing the traced end-to-end request data 515 classified by request type and applying the system for application requests of a defined type in the distributed application.

An applying component 544 may be provided for applying the involvement factor and the critical factor determined by the application service analysis system 530 to availability and functioning management of the distributed application.

Figure 6:
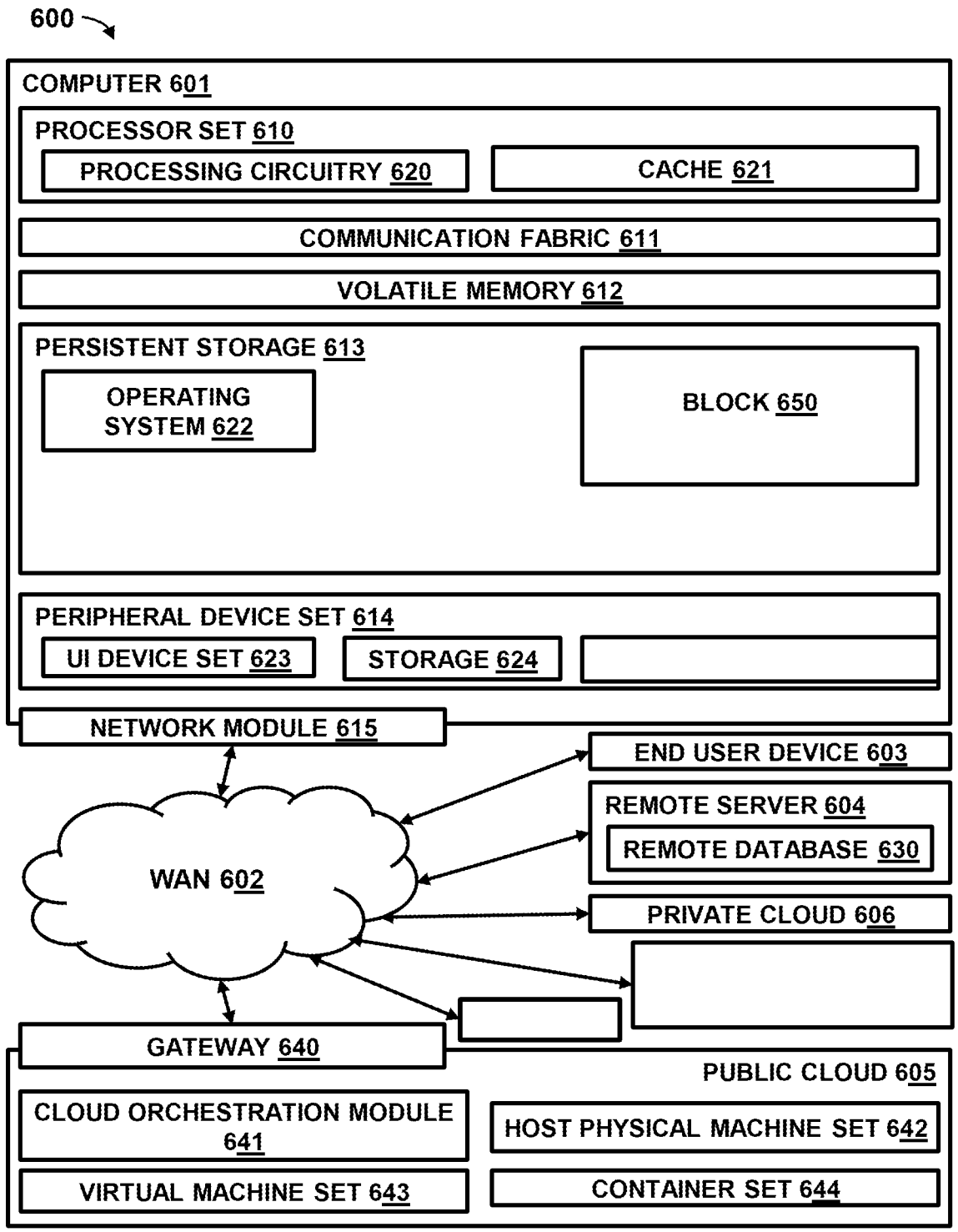
FIG. 6 is a block diagram of an embodiment of a computer system or cloud server in which embodiments of the present invention may be implemented.

FIG. 6 provides a schematic illustration of exemplary network resources associated with practicing the disclosed inventions. The inventions may be practiced by the disclosed processors performing an instruction stream. As shown in FIG. 6, computing environment 600 contains an example of an environment for the execution of at least some of the computer code involved in performing the inventive methods, such as block 650 that may include the component modules of an application service analysis component (e.g., 530, FIG. 5), retained in persistent storage 613. In addition to block 650, computing environment 600 includes, for example, computer 601, wide area network (WAN) 602, end-user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including an operating system 622 and block 650, as identified above), peripheral device set 614 (including user interface (UI), device set 623, storage 624, and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smartphone, smartwatch or another wearable computer, mainframe computer, quantum computer, or any other form of computer or mobile device now known or to be developed in the future that is capable of running a program, accessing a network or querying a database, such as remote database 630. As is well understood in the art of computer technology, and depending upon the technology, the performance of a computer-implemented method may be distributed among multiple computers and/or between multiple locations. On the other hand, in this presentation of computing environment 600, a detailed discussion is focused on a single computer, specifically computer 601, to keep the presentation as simple as possible. Computer 601 may be located on an enterprise server, a web-based server, or located in a cloud environment, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is a memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off-chip." In some computing environments, processor set 610 may be designed for working with qubits and performing quantum computing.

Computer readable program instructions are typically loaded onto computer 601 to cause a series of operational steps to be performed by processor set 610 of computer 601 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 621 and the other storage media discussed below. The program instructions, and associated data, are accessed by processor set 610 to control and direct the performance of the inventive methods. In computing environment 600, at least some of the instructions for performing the inventive methods may be stored as a program and/or a collection of modules in block 650, as part of persistent storage 613.

COMMUNICATION FABRIC 611 includes the signal conduction paths that allow the various components of computer 601 to communicate with each other. Typically, this fabric includes switches and electrically conductive paths, such as the switches and electrically conductive paths that make up busses, bridges, physical input/output ports, and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read-only memory (ROM), but typically at least a portion of the persistent storage allows writing of data, deletion of data, and re-writing of data. Some familiar forms of persistent storage include magnetic disks and solid-state storage devices. Operating system 622 may take several forms, such as various known proprietary operating systems or open-source Portable Operating System Interface type operating systems that employ a kernel. The code included in block 650 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 623 may include components such as a display screen, speaker, microphone, wearable devices (such as goggles and smartwatches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer-readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers. In an exemplary embodiment, WAN 602 enables access to and receipt of data from historical data of safety-related incidents of travel parking spots, which may be stored in a remote database 630. WAN 602 also enables access to and receipt of data from social media sources, blockchain data, and ad-hoc crowd-sourced feedback data, which may be accessed via gateway 640 to public cloud 605, for example.

END USER DEVICE (EUD) 603 is any computer system that is used and controlled by an end user (for example, a customer of an enterprise that operates computer 601) and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as a thin client, heavy client, mainframe computer, desktop computer, and so on. In some embodiments, EUD 603 receives and displays a listing of safety level scores for travel parking spots in the geospatial area of the user's vehicle and one or more recommendations.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs, and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both parts of a larger hybrid cloud.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
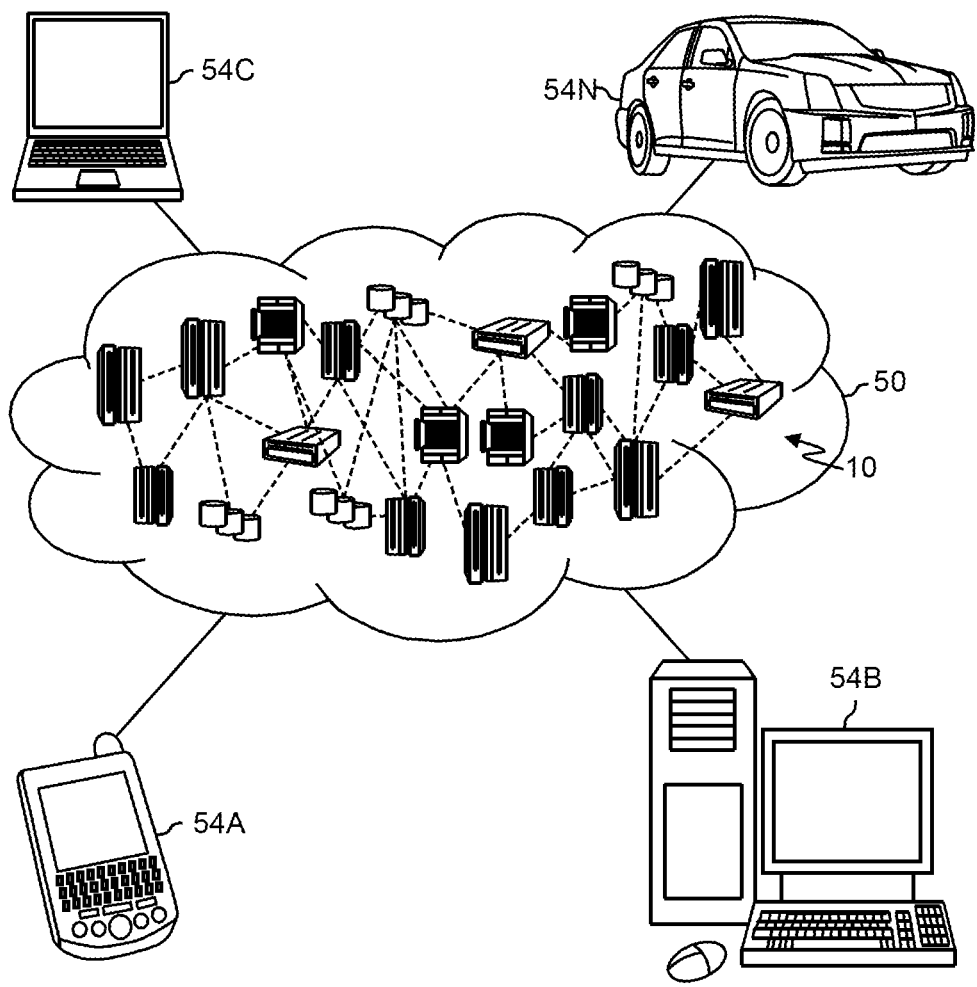
FIG. 7 is a schematic diagram of a cloud computing environment in which embodiments of the present invention may be implemented.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
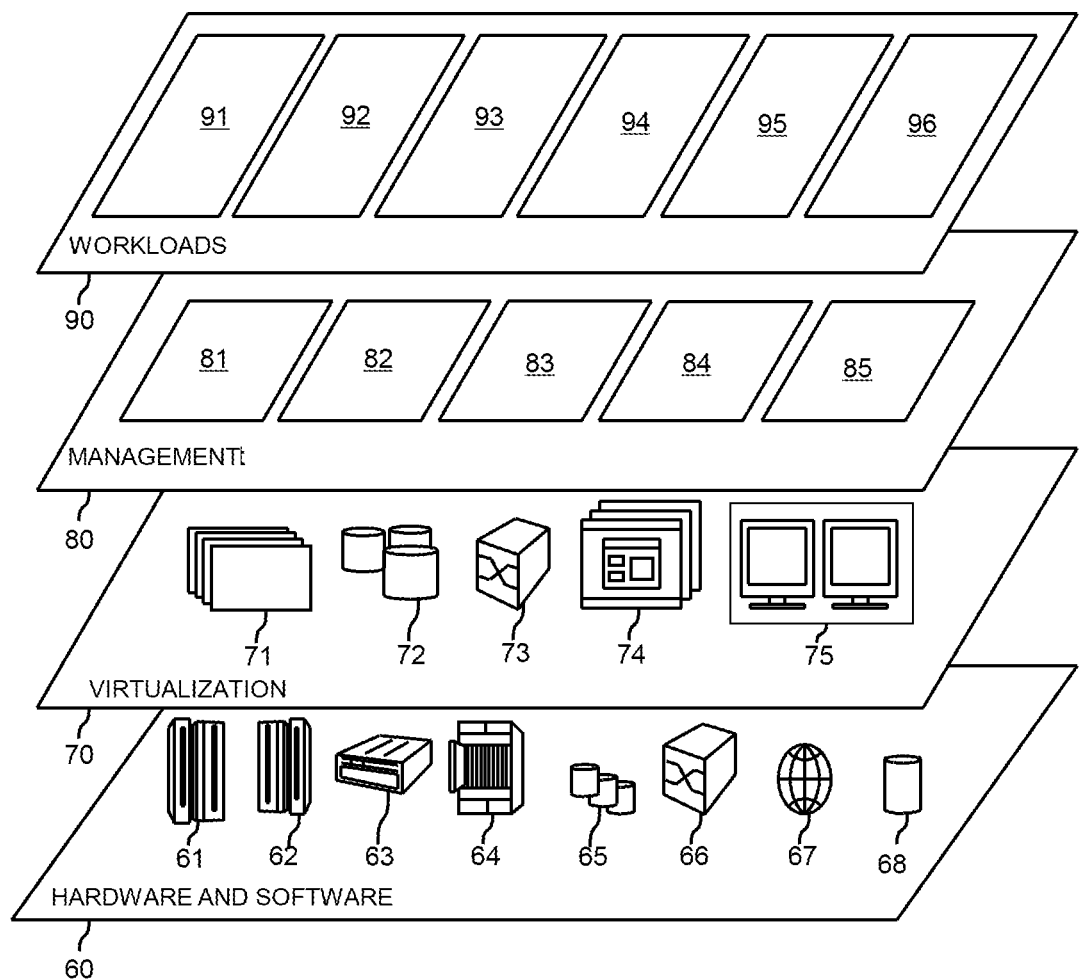
FIG. 8 is a diagram of abstraction model layers of a cloud computing environment in which embodiments of the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed application evaluating and processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for identifying involvement of application services in a distributed application, said method carried out by one or more processors and comprising:

executing a function of components including a traced data component for accessing traced request data of application requests for a distributed application;

building, using the traced request data, a graph of the distributed application to determine dependencies and call frequencies between a plurality of application services that are involved in the application requests, wherein the graph is dynamically updatable to reflect changes in the distributed application;

generating a service involvement factor of an application service of the plurality of application services as a measure of contribution of the application service in correct functioning of the application requests based on the dependencies and the call frequencies between the plurality of application services;

determining a priority of the application service to the distributed application based on the service involvement factor of the application service; and applying the priority of the application service to availability and functioning management of the distributed application, based on the service involvement factor.

2. The method of claim 1, further comprising:

applying a topology of infrastructure resources used by the plurality of application services in the distributed application including the dependencies of the plurality of application services and other resources on the infrastructure resources; and obtaining a resource involvement factor of a first resource used in the distributed application as a measure of involvement of the first resource in the application requests based on the dependency of the plurality of application services and the other resources on the first resource.

3. The method of claim 1, further comprising:

determining a fault tolerance measure of the plurality of application services to faults from a plurality of callee application services; and obtaining a service critical factor of a callee application service of the plurality of callee application services based on the service involvement factor of respective caller application services on which the callee application service depends combined with a caller fault tolerance of the respective caller application services to the callee application service.

4. The method of claim 2, further comprising:

applying a topology of infrastructure resources used by the plurality of application services in the distributed application including the dependencies of the plurality of application services and the other resources on the infrastructure resources; and obtaining a resource critical factor of a first resource based on the service involvement factor of the plurality of application services or the other resources that the first resource supports combined with the fault tolerance measure of the plurality of application services or the other resources to faults received by the plurality of application services or the other resources, from the first resource.

5. The method of claim 1, wherein the building the graph further comprises:

creating a directed graph based on relationships between the plurality of application services involved in the application requests for the distributed application;

applying edge weights to the directed graph based on call rates received by the plurality of application services from the application requests for the distributed application; and determining the service involvement factor of the application service based on a sum of the edge weights of received application service calls.

6. The method of claim 5, further comprising:

applying fault tolerance weightings to the directed graph based on a fault tolerance measure of the plurality of application services to faults from a plurality of callee application services to obtain a service critical factor for a callee application service of the plurality of callee application services based on the service involvement factor of respective caller application services on which the callee application service depends combined with a caller fault tolerance of the respective caller application services to the callee application service.

7. The method of claim 5, further comprising:

extending the directed graph to include infrastructure resources used by the plurality of application services and applying the edge weights to the directed graph for the infrastructure resources based on at least one of the dependency of the plurality of application services on the infrastructure resources and the dependency of the infrastructure resources on other resources, to obtain a resource involvement factor of a resource in the application requests.

8. The method of claim 5, wherein the directed graph is dynamically updated to reflect the changes to respective service involvement factors of the plurality of application services and respective resource critical factors of a plurality of resources associated with the distributed application.

9. The method of claim 1, further comprising:

performing the method for all application requests in the distributed application.

10. The method of claim 1, wherein the traced request data is classified by an application request type and the service involvement factor is classified based on a defined application request type of the distributed application.

11. A system for identifying involvement of application services in a distributed application, comprising:

one or more computer processors;

at least one computer-readable medium; and program instructions stored on the at least one computer-readable medium, the program instructions comprising:

program instructions to execute a function of components including a traced data component for accessing traced request data of application requests for a distributed application;

program instructions to build, using the traced request data, a graph of the distributed application to determine dependencies and call frequencies between a plurality of application services that are involved in the application requests, wherein the graph is dynamically updatable to reflect changes in the distributed application;

program instructions to generate a service involvement factor of an application service of the plurality of application services as a measure of contribution of the application service in correct functioning of the application requests based on the dependencies and the call frequencies between the plurality of application services;

program instructions to determine a priority of the application service to the distributed application based on the service involvement factor of the application service; and program instructions to apply the priority of the application service to availability and functioning management of the distributed application, based on the service involvement factor.

12. The system of claim 11, further comprising:
program instructions to apply a topology of infrastructure resources, by a topology component of the system, used by the plurality of application services in the distributed application including the dependencies of the plurality of application services and other resources on the infrastructure resources; and
program instructions to generate a resource involvement factor of a first resource, by an involvement component of the system, used in the distributed application as a measure of involvement of the first resource in the application requests based on the dependency of the plurality of application services and the other resources on the first resource.

13. The system of claim 11, further comprising:
program instructions to determine fault tolerance measure of the plurality of application services to faults from a plurality of callee application services; and
program instructions to obtain a service critical factor of a callee application service of the plurality of callee application services based on the service involvement factor of respective caller application services on which the callee application service depends combined with a caller fault tolerance of the respective caller application services to the callee application service.

14. The system of claim 11, further comprising:
program instructions to graph a directed graph of the plurality of application services in the application requests and apply edge weights to the directed graph based on call rates between the plurality of application services in the application requests to obtain the service involvement factor of the application service in the application requests.

15. The system of claim 14, further comprising:
program instructions to apply fault tolerance weightings to the directed graph based on a fault tolerance measure of the plurality of application services to faults from a plurality of callee application services to obtain a service critical factor for a callee application service of the plurality of callee application services based on the service involvement factor of respective caller application services on which the callee application service depends combined with a caller fault tolerance of the respective caller application services to the callee application service.

16. The system of claim 15, further comprising:
program instructions to extend the directed graph to include infrastructure resources used by the plurality of application services and apply the edge weights to the directed graph for the infrastructure resources based on the dependency of the plurality of application services on the infrastructure resources and the dependency of the infrastructure resources on other resources to obtain a resource involvement factor of a resource in the application requests.

17. The system of claim 15, further comprising:
program instructions to dynamically update the directed graph to reflect the changes in the distributed application.

18. The system of claim 11, further comprising:
program instructions to classify the traced request data by a request type and classify the service involvement factor based on a defined application request type of the distributed application.

19. A computer program product for identifying involvement of application services in a distributed application, the computer program product comprising:
program instructions stored on at least one computer-readable storage medium, the program instructions comprising:
program instructions to execute a function of components including a traced data component for accessing traced request data of application requests for a distributed application;
program instructions to build, using the traced request data, a graph of the distributed application to determine dependencies and call frequencies between a plurality of application services that are involved in the application requests, wherein the graph is dynamically updatable to reflect changes in the distributed application;
program instructions to generate a service involvement factor of an application service of the plurality of application services as a measure of contribution of the application service in correct functioning of the application requests based on the dependencies and the call frequencies between the plurality of application services;
program instructions to determine a priority of the application service to the distributed application based on the service involvement factor of the application service; and
program instructions to apply the priority of the application service to availability and functioning management of the distributed application, based on the service involvement factor.

20. The computer program product of claim 19, further comprising:
program instructions to apply a topology of infrastructure resources used by the plurality of application services in the distributed application including the dependencies of the plurality of application services and other resources on the infrastructure resources; and
program instructions to generate a resource involvement factor of a first resource used in the distributed application as a measure of and extent of involvement of the first resource in the application requests based on the dependency of the plurality of application services and the other resources on the first resource.

* * * * *